United States Patent [19]
Liu

[11] Patent Number: 5,684,909
[45] Date of Patent: Nov. 4, 1997

[54] LARGE EFFECTIVE AREA SINGLE MODE OPTICAL WAVEGUIDE

[76] Inventor: Yanming Liu, 41 Glendale Dr., Horseheads, N.Y. 14840

[21] Appl. No.: 770,402

[22] Filed: Dec. 20, 1996

[51] Int. Cl.⁶ .................................................. G02B 6/22
[52] U.S. Cl. .................................. 385/127; 385/124
[58] Field of Search .............................. 385/126, 127, 385/123, 122, 128, 124

[56] References Cited

U.S. PATENT DOCUMENTS

| | | | |
|---|---|---|---|
| 4,715,679 | 12/1987 | Bhagavatula | 350/96.33 |
| 4,770,492 | 9/1988 | Levin et al. | 350/96.29 |
| 4,852,968 | 8/1989 | Reed | 350/96.33 |
| 5,363,463 | 11/1994 | Kleinerman | 385/123 |

*Primary Examiner*—John Ngo

[57] ABSTRACT

A single mode optical waveguide fiber having a core refractive index profile of at least four segments is disclosed. The main features of the core design are: at least two non-adjacent core profile segments have positive Δ %; are, at least two non-adjacent segments have negative Δ %. The novel waveguide core design provides a single mode waveguide which is suitable for high rate, long regenerator spacing systems which incorporate optical amplifiers. The waveguide core structure also lends itself to the manufacture of dispersion managed waveguide fiber.

11 Claims, 5 Drawing Sheets

LARGE EFFECTIVE AREA SINGLE MODE OPTICAL WAVEGUIDE

BACKGROUND OF THE INVENTION

The invention is directed to a single mode optical waveguide fiber designed for use in long distance, high bit rate systems operating in a wavelength range of about 1500 nm to 1600 nm. In particular, the novel waveguide fiber has a large effective area, over the operating wavelength range, to reduce the non-linear optical effects which distort the telecommunication signal.

A single mode waveguide, having a large effective area, will have reduced non-linear optical effects, including self phase modulation, four wave mixing, cross phase modulation, and non-linear scattering processes. Each of these effects causes degradation of signal in high power systems.

The scattering processes, which degrade signal, are in general described by an equation containing a term $\exp(cP/A_{\mathit{eff}})$, where c is a constant, P is signal power, and $A_{\mathit{eff}}$ is effective area. The remaining non-linear effects are described by equations which include the ratio, $P/A_{\mathit{eff}}$, as a multiplier. Thus, an increase in $A_{\mathit{eff}}$ produces a decrease in the non-linear contribution to the degradation of a light signal.

The requirement in the telecommunication industry for greater information capacity over long distances, without regenerators, has led to a reevaluation of single mode fiber index profile design.

The focus of this reevaluation has been to provide optical waveguides which:

- reduce non-linear effects, such as those noted above;
- are optimized for the lower attenuation operating wavelength range around 1550 nm;
- are compatible with the gain vs. wavelength curve of optical amplifiers; and,
- retain the desirable properties of optical waveguides such as low attenuation, high strength, fatigue resistance, and bend resistance.

An additional requirement, specifically directed to reducing four wave mixing, may be to place the zero dispersion wavelength of the waveguide fiber outside the operating window.

Previous studies, such as that disclosed in U.S. patent application Ser. No. 08/378,780, have started from the basic concepts of segmented core design first introduced in U.S. Pat. No. 4,715,679, Bhagavatula. Larger effective area waveguides were discovered for a class of core designs disclosed in the Ser. No. 08/378,780 cited above. A particular design incorporating at least one core region having a minimum index below that of the clad was disclosed in that application.

Using these keys, the model, which predicts properties for segmented core designs, was used to generate a family of core designs having an $A_{\mathit{eff}}$ and a mode power distribution (or electric field intensity distribution) which characterizes waveguide fiber suitable for use in the very highest performance telecommunications systems. A provisional application was mailed 9 November 95 directed to this new family of large effective area waveguides.

This application is an extension of the work disclosed in application Ser. No. 08/378,780 and the provisional application mailed 9 November 1995.

The particular feature of the novel family of profile designs of this application is that large effective area is combined with a total dispersion slope near zero over a selected operating wavelength range. This combination provides reduced non-linear signal degradation because of the increased effective area, as well as, reduced linear dispersion over the selected wavelength range.

DEFINITIONS

The effective area is $A_{\mathit{eff}} = 2\pi (\int E^2 \, r \, dr)^2 / (\int E^4 \, r \, dr)$, where the integration limits are 0 to $\infty$, and E is the electric field associated with the propagated light.

An effective diameter, $D_{\mathit{eff}}$ may be defined as, $$D_{\mathit{eff}} = 2(A_{\mathit{eff}}/\pi)^{1/2}$$

The mode field area $A_{\mathit{mf}}$ is $\pi(D_{\mathit{mf}}/2)^2$, where $D_{\mathit{mf}}$ is the mode field diameter measured using the Peterman II method wherein, $2w = D_{\mathit{mf}}$ and $w^2 = (2 \int E^2 \, r \, dr / \int [dE/dr]^2 \, r \, dr)$, the integral limits being 0 to infinity.

An alpha profile is, $n = n_0(1 - \Delta(r/a)^\alpha)$, where $n_0$ is the greatest refractive index of the alpha index profile, $\Delta$ is defined below, r is radius, and a is the radius measured from the first to the last point of the alpha index profile. One may chose r to be zero at the $n_0$ point of the alpha index profile or the first point of the profile may be translated a selected distance from the waveguide centerline. An alpha profile having alpha equal to 1 is triangular. When alpha is two the index profile is a parabola. As the value of alpha becomes greater than 2 and approaches about 6, the index profile becomes more nearly a step index profile. A true step index profile is described by an alpha of infinity, but an alpha of about 4 to 6 is a step index profile for practical purposes.

The width of an index profile segment is the distance between two vertical lines drawn from the respective beginning and ending points of the index profile to the horizontal axis of the chart of refractive index vs. radius.

The % index delta is $\%\Delta = [(n_1^2 - n_0^2)/2n_1^2] \times 100$, where $n_1$ is a core index and $n_0$ is the clad index. Unless otherwise stated, $n_1$ is the maximum refractive index in the core region characterized by a % $\Delta$.

The zero reference for refractive index is chosen as the minimum refractive index in the clad glass layer. A region of refractive index in the core which is less than this minimum value is assigned a negative value.

A refractive index profile in general has an associated effective refractive index profile which is different in shape. An effective refractive index profile may be substituted, for its associated refractive index profile without altering the waveguide performance. See reference, *Single Mode Fiber Optics*, Marcel Dekker Inc., Luc B. Jeunhomme, 1990, page 32, section 1.3.2.

Bend performance is defined by a standard testing procedure in which the attenuation induced by winding a waveguide fiber about a mandrel is measured. The standard test is a measurement of induced attenuation caused in a waveguide fiber by a bend formed by one turn of fiber about a 32 mm mandrel and bends formed by 100 turns about a 75 mm mandrel. The maximum allowed bending induced attenuation is usually specified in the operating window around 1300 nm and around 1550 nm.

An alternative bend test is the pin array bend test which is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

A percent variation in $\Delta_i$ % of a refractive index profile means that any of the $\Delta_i$ % may be varied individually or in combination by the given percent.

A percent variation in combined radius means that the change in overall core radius, $\Delta r$, is distributed proportionately among the radii of the individual core segments.

SUMMARY OF THE INVENTION

The subject invention meets the need for a single mode optical waveguide fiber which offers the benefits of a relatively large effective area together with a substantially flat dispersion slope, i.e., a dispersion slope having a magnitude of about 0.03 ps/nm²-km or less, over an extended operating wavelength range.

A first aspect of the invention is a single mode waveguide having a glass core comprising at least four segments. Each segment is characterized by a refractive index profile, an outside radius, $r_i$, and a $\Delta_i$ %. The subscript on r and $\Delta$ refers to a particular segment. The segments are numbered 1 through n beginning with the innermost segment which includes the waveguide long axis centerline. A clad layer having a refractive index of $n_c$ surrounds the core. The core has two non-adjacent segments each having a positive $\Delta$ %, and two additional non-adjacent segments having negative $\Delta$ %. Using this basic core configuration, a plurality of sets of $\Delta_i$ % and $r_i$ have been found which provide for a substantially flat total dispersion curve, i.e., a curve having a slope of about 0.03 ps/nm²-km or less, over a pre-selected wavelength range, and, an effective area of at least 60 microns². The effective area of several core designs, having this core configuration, are greater than 70 microns².

A preferred embodiment of this aspect of the invention provides substantially zero dispersion slope over the wavelength range of about 1450 nm to 1580 nm. This range includes the low attenuation region around 1550 nm and the high gain wavelength range of the erbium optical amplifier.

The preferred $\Delta_i$ %'s for the two non-adjacent positive $\Delta$ % segments are in the range of about 0.1% to 0.8%. For the two negative $\Delta$ % segments the preferred ranges are −0.80% to −0.15%.

The preferred refractive index profile of the positive $\Delta$ % segments is chosen from the group consisting of alpha profiles, having alpha in the range of about 1 to 6, step index, rounded step index profiles, and trapezoidal profiles. The preferred refractive index profile of the negative $\Delta$ % segments is chosen from the group consisting of inverted trapezoidal, inverted step, and inverted rounded step index profiles. It is understood that in a particular profile, one negative $\Delta$ % segment may have an inverted trapezoidal shape while the other negative $\Delta$ % segment has an inverted rounded step index shape. The number of combinations and permutations of the at least four segments refractive index profiles is quite large. Thus, for practical purposes, the search for core index profile designs which provide the required waveguide fiber properties is done using a computer model.

Dopant diffusion on centerline can cause a central index depression in the shape of an inverted cone. Also, diffusion at the location of abrupt changes in dopant concentration can produce rounding of the shoulders of a step index profile. The model is designed to take into account essentially any refractive index profile variation caused by dopant out-diffusion. A typical center diffusion depression is an inverted cone having a base radius dimension no greater than about 2 microns.

In a most preferred embodiment, segments 1 and 3 have a positive $\Delta$ % and segments 2 and 4 have a negative $\Delta$ %. As noted above, the segments are numbered sequentially beginning at 1 for the segment which includes the long axis of symmetry of the waveguide. The radii of this embodiment have limits, $r_1$ in the range of about 3 to 5 microns, $r_2$ no greater than about 10 microns, $r_3$ no greater than about 17 microns, and $r_4$ no greater than about 25 microns. The respective $\Delta$ % of the segments in this embodiment have limits, $\Delta_1$ % in the range of about 0.20% to 0.70%, $\Delta_2$ % and $\Delta_4$ % in the range of about −0.80% to −0.15%, and, $\Delta_3$ % in the range of about 0.05% to 0.20%.

The core design model may be used in two ways:
one may input structural parameters, i.e., the number of segments and relative location of core segments, the index profile shape of each segment, and the corresponding $\Delta_i$ % and the $r_i$ of each segment, and calculate the waveguide parameters which are associated with the structure so described; or,
one may input functional parameters, i.e., cut off wavelength, zero dispersion wavelength, total dispersion slope, effective area, mode field diameter, operating wavelength range, and bond induced attenuation of the waveguide, and calculate a family of structures which provide such functionality.

Thus, it is appropriate to assert a second aspect of the invention as a waveguide fiber having at least four segments. Two non-adjacent segments have positive $\Delta$ % and two non-adjacent segments have negative $\Delta$ %. The $r_i$ and $\Delta_i$ % of the respective segments are chosen to provide a waveguide characterized by:
a total dispersion slope having a magnitude of about 0.03 ps/nm²-km or less over a wavelength range of about 1400 nm to 1575 nm;
a zero dispersion wavelength outside the operating window, i.e, in the range of about 1200 nm to 1500 nm or greater than about 1575 nm (An upper limit is determined by the required dispersion in the operating window. For most uses an upper limit is about 1750 nm.);
a mode field diameter greater than about 9 microns; and,
a pin array bend induced attenuation $\leq$20 dB.

A notable property of the family of waveguides, described in this second aspect of the invention, is their ease of manufacture. In particular, the waveguides are relatively insensitive to variations in the $\Delta_i$ % of +/−3% and variations in the combined radius of +/−1%, as shown by the calculated parameters of Table 1.

These and other aspects and advantages of the novel family of core designs will be further disclosed and described with the help of the following drawings.

DETAILED DESCRIPTION OF THE INVENTION

Communications systems which typically require 1 gigabit/s, and higher, transmission rates, together with regenerator spacing in excess of 100 km, usually make use of optical amplifier technology or wavelength division multiplexing techniques. Thus waveguide fiber manufacturers have had to design waveguides which are less susceptible to non-linear effects induced by higher power signals or by four wave mixing, which can occur in multiplexed systems. It is understood that a suitable waveguide fiber must have low linear dispersion and low attenuation as well. In addition, the waveguide fiber must display these properties over a particular extended wavelength range in order to accommodate wavelength division multiplexing.

Waveguide designs which also are relatively easy to manufacture and which permit management of dispersion are favored, because of their low cost and added flexibility. The designs described herein are well suited to a dispersion managing strategy in which the waveguide dispersion is varied along a waveguide fiber length to toggle the total dispersion between positive and negative values.

The novel segmented core design of this application displays the required properties catalogued above.

Figure 1A:
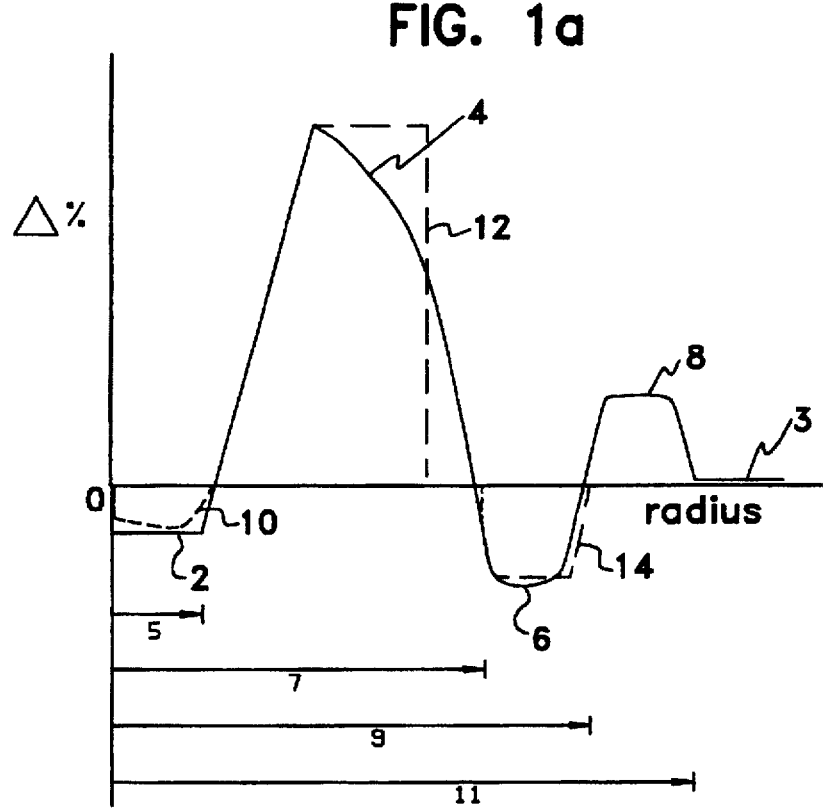
FIGS. 1a. and 1b. illustrate a general shape of a four segment embodiment of the novel core index profile.
Figure 1B:
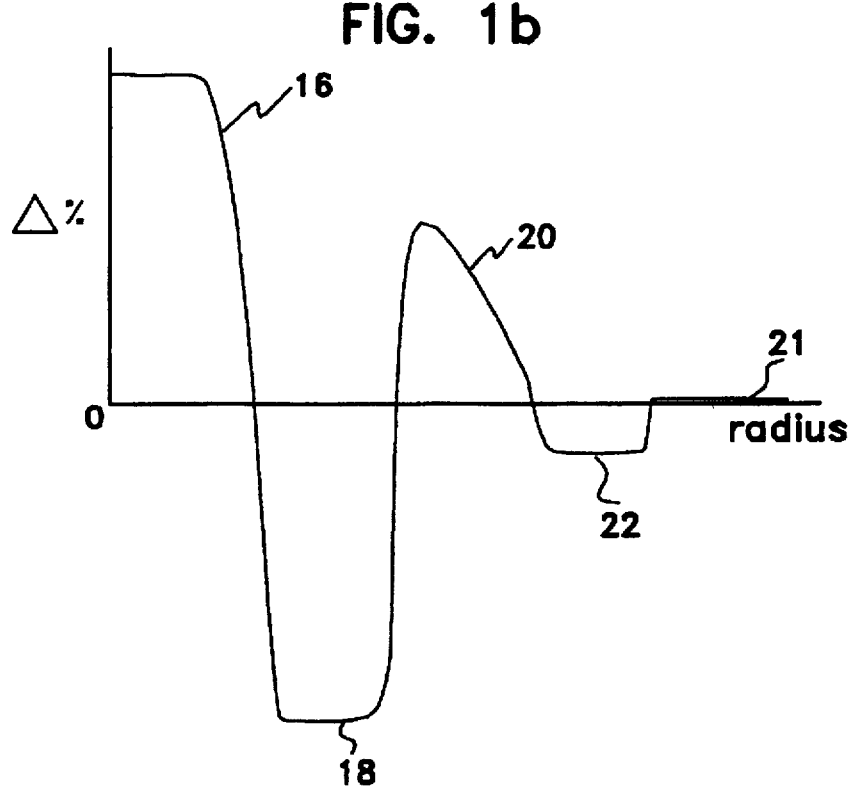

A general representation of the core refractive index profile is illustrated in FIGS. 1a and 1b, which show $\Delta$ % charted vs. waveguide radius. Although FIGS. 1a and 1b show only four discrete segments, it is understood that the functional requirements may be met by forming a core having more than four segments. However, embodiments having fewer segments are usually easier to manufacture and are therefore preferred.

Index profile structure characteristic of the novel waveguide fiber is shown by core segments 4 and 8, which are non-adjacent segments having positive $\Delta$ %, and, core segments 2 and 6, which are non-adjacent segments having negative $\Delta$ %. The segments having positive and the negative $\Delta$ % may be separated by more than one segment. The refractive index profile associated with each segment may be adjusted to reach a core design which provides the required waveguide fiber properties.

Dashed lines 10, 12, and 14 show alternative refractive index profile shapes for three of the segments comprising the novel waveguide core. Outside radii 5, 7, 9, and 11, of the segments also may be varied to arrive at a core design which provides the required waveguide properties. Given the variables; number of segments, segment profile shape, segment $\Delta$ %, and radius, it is clear that the design problem is most easily addressed using a computer model. The basic elements of such a model are discussed in application Ser. No. 08/323,795.

FIG. 1b illustrates a variation of the novel waveguide fiber core design. In this case the segments having positive $\Delta$ %, 16 and 20 are the first and third segments. The second and fourth segments, 18 and 22, have a negative $\Delta$ %. Lines 3 and 21, in the respective FIGS. 1a and 1b, represent the refractive index of the cladding which is used to calculate the $\Delta$ %'s characteristic of the segments.

EXAMPLE 1

Four Segment Embodiment

Figure 2A:
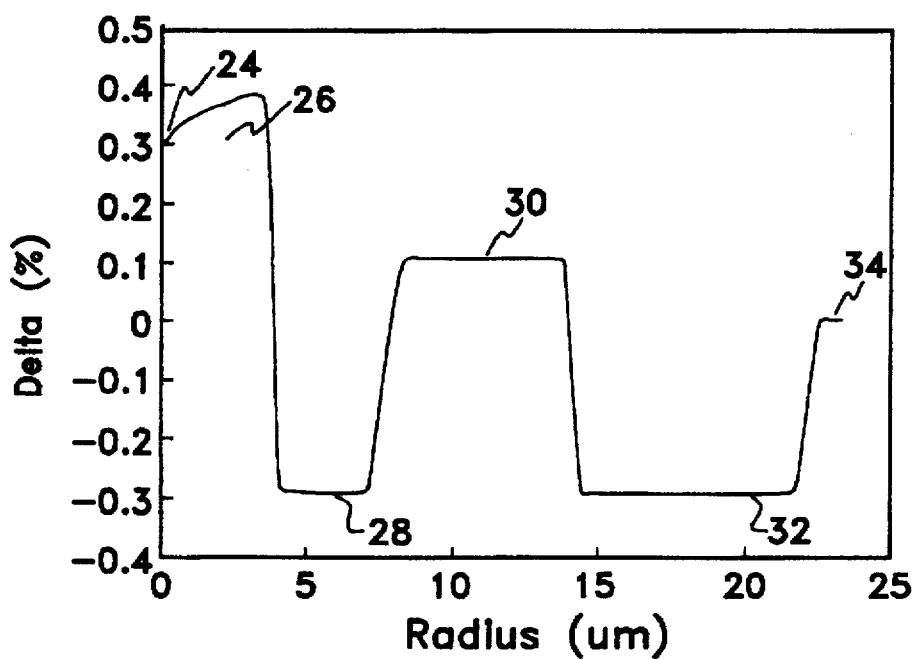
FIGS. 2a. and 2b. are specific examples of a four segment embodiment of the novel core index profile.

The chart of FIG. 2a is an embodiment of the novel waveguide core having the four segments, 26, 28, 30 and 32. Each of the segments has a profile shape which is a rounded step. The rounding of the corners of the step profiles as well as the centerline refractive index depression 24 may be due to diffusion of dopant during manufacture of the waveguide fiber. It is possible, but often not necessary to compensate, for example, in the doping step, for such diffusion.

Referring to FIG. 2a, $\Delta_1$ % of segment 26 is near 0.39%, $\Delta_2$ % of segment 28 is near −0.25%, $\Delta_3$ % of segment 30 is near 0.12%, and $\Delta_4$ % of segment 32 is near −0.25%. The respective outside radius of each of the segments, beginning at the innermost segment and proceeding outward, is about 4 microns, about 6.5 microns, about 15 microns, and about 22 microns.

This core structure provides a waveguide fiber having the properties:

mode field diameter 9 microns;

$D_{eff}$ 9.3 microns;

$A_{eff}$ 68 microns$^2$;

cut off wavelength 1400 nm;

pin array induced bond loss 20 dB; and, total dispersion slope $\leq$0.03 ps/nm$^2$-km.

COMPARATIVE EXAMPLE 2

Four Segment Embodiment

Figure 2B:
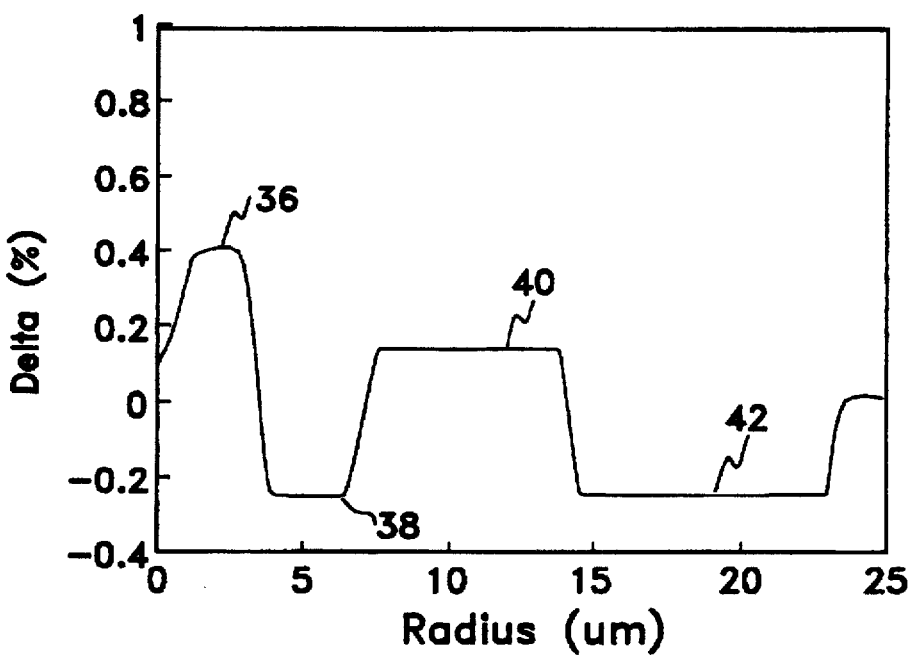

The chart of FIG. 2b is an embodiment of the novel waveguide core having the four segments, 36, 38, 40 and 42. Each of the segments has a profile shape which is a rounded step. As noted above, the rounding of the corners of the step profiles as well as the centerline refractive index depression may be due to diffusion of dopant.

Referring to FIG. 2b, $\Delta_1$ % of segment 36 is near 0.40%, $\Delta_2$ % of segment 38 is near −0.25%, $\Delta_3$ % of segment 40 is near 0.12%, and $\Delta_4$ % of segment 42 is near −0.25%. The respective outside radius of each of the segments, beginning at the innermost segment and proceeding outward, is about 4 microns, about 65 microns, about 15 microns, and about 23.5 microns.

Note the structural differences between the index profile of FIG. 2a and that of FIG. 2b are substantially that the negative $\Delta$ %'s are less negative and that the overall core radius has been increased by 1 to 2 microns.

This core structure provides a waveguide fiber having the properties:

mode field diameter 9.2 microns;

$D_{eff}$ 9.6 microns;

$A_{eff}$ 72 microns$^2$;

cut off wavelength 1404 nm;

pin array induced bend loss 12 dB; and, total dispersion slope $\leq$0.03 ps/nm$^2$-km.

Cut off wavelength is increased only slightly, but bend resistance is dramatically improved and $A_{eff}$ is increased by about 6% in the comparative example. The structure alterations which combine to produce a waveguide having improved performance are the increase in Δ % in the negative index segments and the increase in overall radius. It is an indication of the robustness of the novel core index profile design that an increase in $A_{eff}$ and in bend resistance can be achieved simultaneously.

Figure 3:
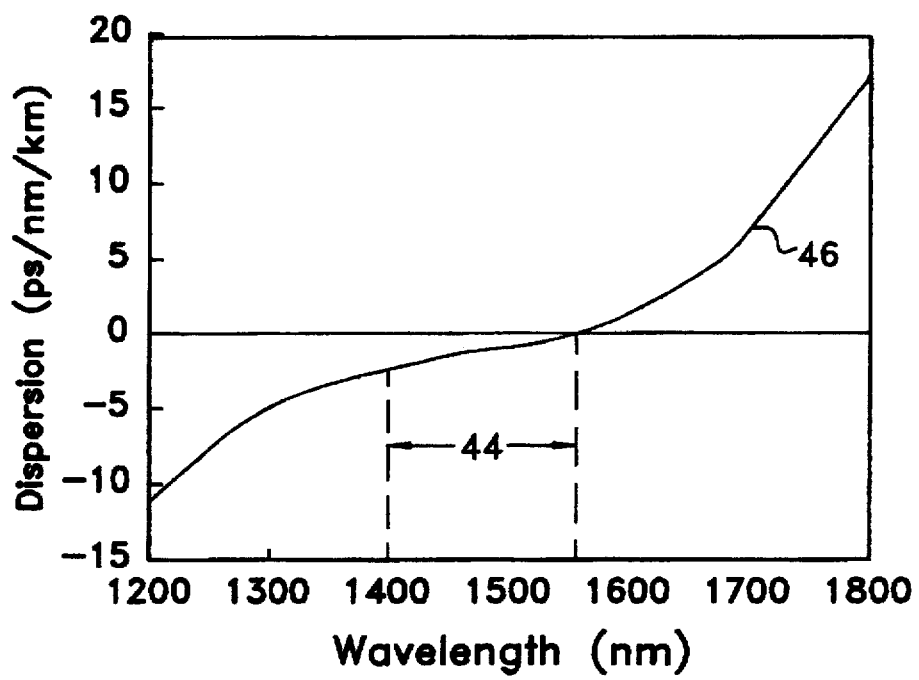
FIG. 3. shows a typical total dispersion curve characteristic of the novel waveguide fiber.

The total dispersion curve, 46, characteristic of the novel core refractive index profile design is shown in FIG. 3. The flattened region of the curve, 44, spans a wavelength range from about 1400 nm to 1570 nm. Thus, in this wavelength operating range, non-linear dispersion effects are limited due to the larger effective area. Also linear dispersion is limited by maintaining low total dispersion magnitude over the operating wavelength.

Figure 4:
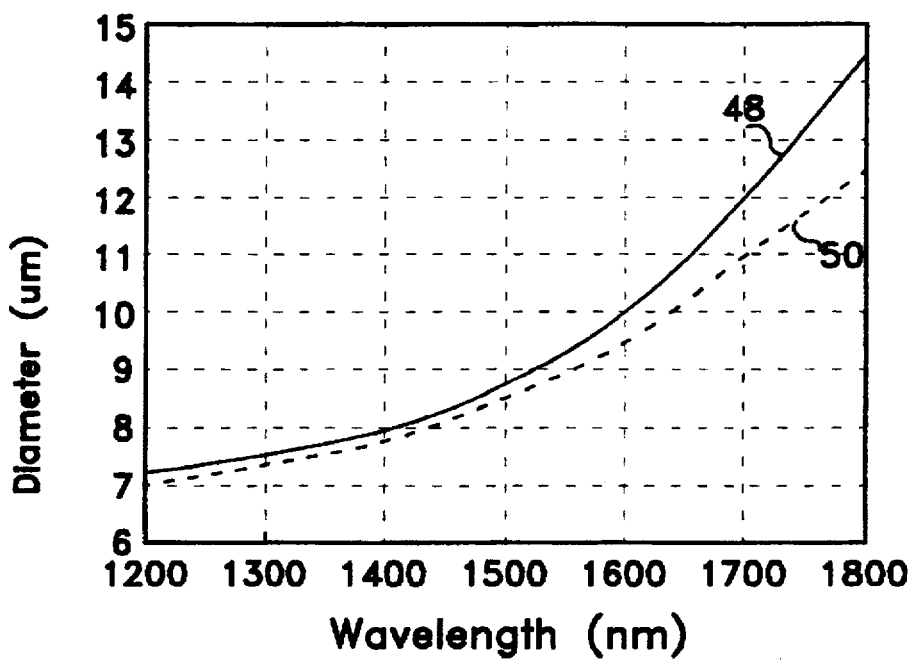
FIG. 4. compares $D_{eff}$ to MFD over a wavelength range for a subset of the novel core profile designs.

An advantageous property of a subset of the novel core design is shown in FIG. 4. The effective diameter, 48, is larger than the mode field diameter, 50, over a wavelength range of at least 1200 nm to 1800 nm. The larger $D_{eff}$ serves to limit non-linear effects by decreasing signal power per unit area. The smaller mode field diameter provides for better bend resistance because a larger fraction of the signal power is guided rather than radiated. It is this feature of the novel waveguide fiber core which limits non-linear effects and at the same time provides good power confinement within the waveguide and thus good bend resistance.

Figure 5A:
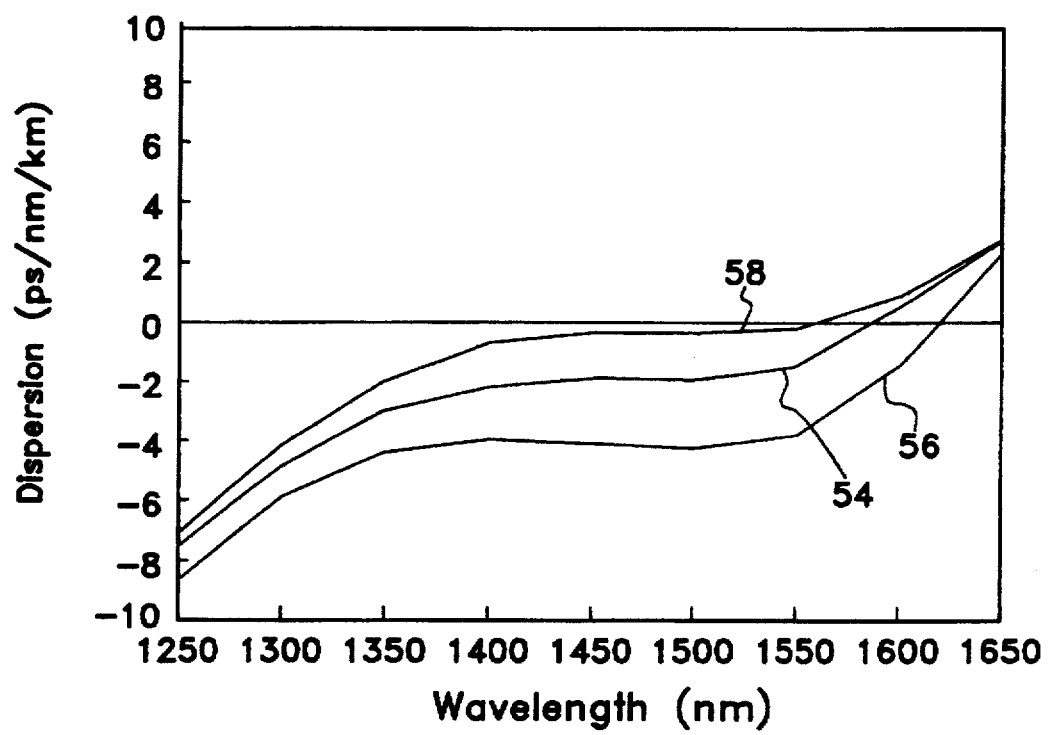
FIGS. 5a, 5b, and 5c show the sensitivity of the total dispersion to changes in radius or refractive index of the segments of the novel core index profile.

The relative insensitivity to changes in total radius of the total dispersion vs. wavelength is shown in FIG. 5a. Curve 54 is the reference curve for a core having a combined radius r. Curve 58 is the total dispersion curve for a waveguide fiber having a core combined radius, as defined above, 1% greater than r. Curve 56 is the total dispersion curve for a core combined radius 1% less than r. Note that the offset of curves 56 and 58 form reference curve 54 does not exceed about 2 ps/nm-km.

Figure 5B:
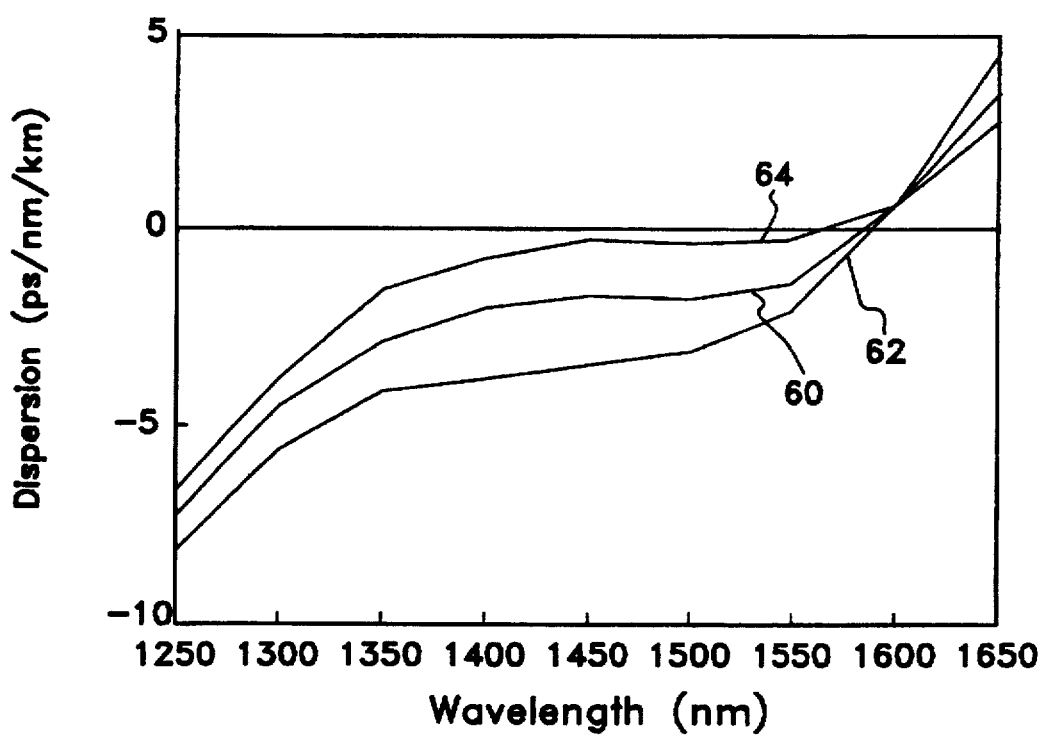

The relative insensitivity of total dispersion to changes in refractive index of any or all of the segments is shown in FIG. 5b. Curve 60 is the reference curve. Curves 64 and 62 are represent total dispersion for cases in which the refractive index varies by 3 and −3%, respectively. Here again curves 64 and 62 do not differ from reference curve 60 by more than about 2 ps/nm-km.

Table 1. gives the mean and standard deviation of selected waveguide fiber parameters when combined radius is varied by +/−1% and refractive index is simultaneously varied by +/−3%. The reference profile is substantially that given in comparative example 2.

TABLE 1

|  | Mean | STD | Reference |
|---|---|---|---|
| $\lambda_o$ nm | 1581.7 | 20 | 1580 |
| D1550ps/nm-km | −1.1 | 1.23 | −1.0 |
| Mode Field Dia. microns | 9.15 | 0.19 | 9.2 |
| Cutoff λ nm | 1470 | 21 | 1460 |
| Bend Loss dB | 21.1 | 7.5 | 12 |

The deviation from target values is seen to be small, which indicates the core design provides relatively stable waveguide fiber properties for the stated variations in waveguide fiber core structure.

Figure 5C:
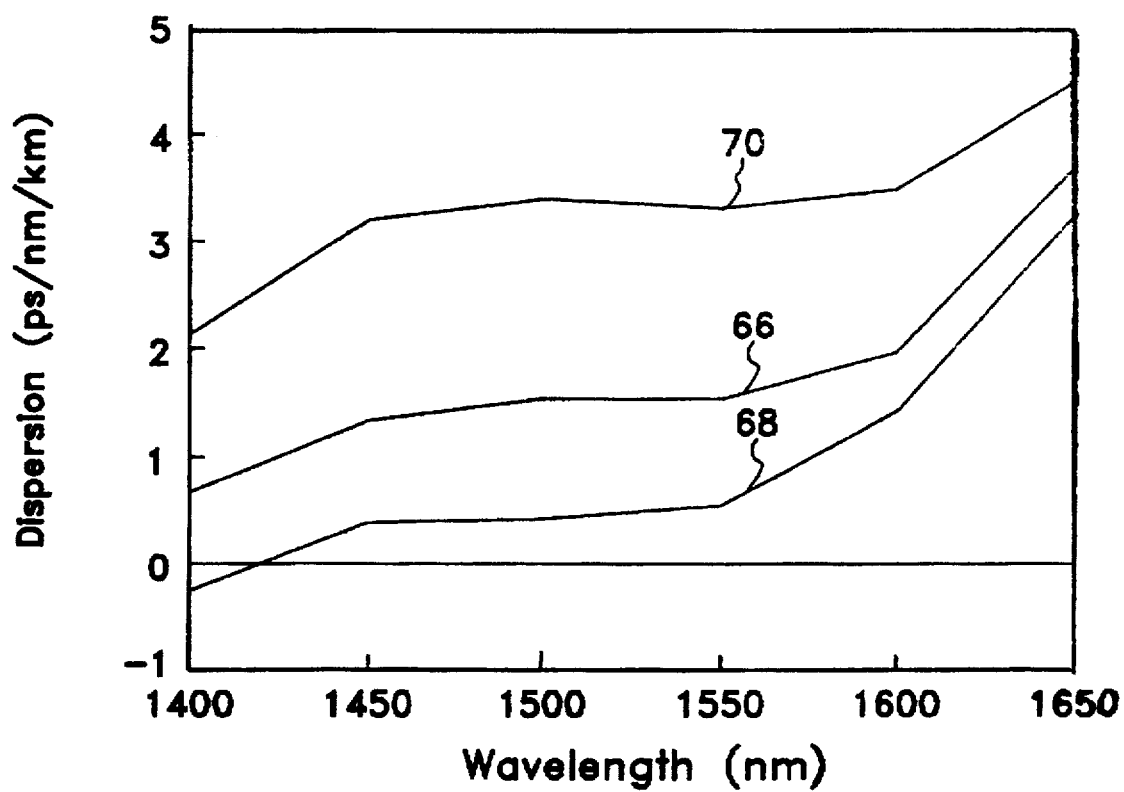

The radius variations which produce a change in sign of total dispersion are shown in FIG. 5c with reference to FIG. 5a. As before, the reference total dispersion curve 54. A change in combined radius of 1.5% gives total dispersion curve 68. Combined radius changes of 2.5% and 4.5% give total dispersion curves 66 and 70, respectively. Thus the novel core design is readily adaptable to manufacture of dispersion managed waveguide fiber. Periodic changes in radius along the fiber length will produce periodic changes in the sign of the total dispersion so that total dispersion for the entire waveguide fiber length may be essentially zero while the total dispersion magnitude at points along the waveguide fiber are non-zero. This management of total dispersion essentially eliminates four wave mixing while maintaining a very low full fiber length total dispersion.

Although particular embodiments of the invention have herein been disclosed and described, the invention is nonetheless limited only by the following claims.

What is claimed is:

1. A single mode optical waveguide fiber comprising:

a glass core, disposed symmetrically about the waveguide fiber long axis centerline, and including at least four segments, each said segment having a refractive index profile, a refractive index $\Delta_i$ %, and an outside radius $r_i$, where i is an integer which refers to a particular segment, the segments being sequentially numbered 1 through n beginning with 1 at the centerline;

a glass clad layer formed upon and enclosing said core, said clad layer having a refractive index $n_c$;

wherein, at least two non-adjacent core segments have a refractive index Δ % which is positive, and at least two non-adjacent core segments have a refractive index Δ % which is negative;

wherein the outside radius $r_i$ and the $\Delta_i$ % of each said segment is chosen to provide a dispersion slope having a magnitude of about 0.03 ps/nm$^2$-km or less over a preselected wavelength range and an effective area greater than 60 microns$^2$.

2. The single mode optical waveguide fiber of claim 1 wherein the preselected wavelength range is about 1450 nm to 1580 nm.

3. The single mode optical waveguide fiber of claim 1 wherein said at least two segments having a positive Δ %, have a Δ % in the range of about 0.1% to 0.8% and said at least two segments having a negative Δ %, have a Δ % in the range of about −0.80% to −0.1%.

4. The single mode optical waveguide fiber of claim 1 wherein said at least two segments having a positive Δ %, have a refractive index profile chosen from the group consisting of an alpha profile, wherein alpha ranges from 1 to about 6, a step index profile, a rounded step index profile, and a trapezoidal profile, and said at least two segments having a negative Δ %, have a refractive index profile selected form the group consisting of an inverted step index profile, an inverted rounded step profile and an inverted trapezoidal profile.

5. The singlemode optical waveguide fiber of claim 4 wherein the refractive index profile of the first segment of said glass core is characterized by a maximum refractive index $n_1$, spaced apart from the waveguide centerline, the refractive index profile being monotone decreasing between $n_1$ and the centerline, to form about the centerline an index depression substantially in the shape of an inverted cone, the inverted cone having a base radius no greater than about 2 microns.

6. The single mode optical waveguide fiber of claim 5 wherein said glass core includes four segments, and $\Delta_1$ % and $\Delta_3$ % are positive and $\Delta_2$ % and $\Delta_4$ % are negative.

7. The single mode optical waveguide fiber of claim 6 wherein $r_1$ is in the range of about 3 to 5 microns, $r_2$ is no greater than about 10 microns, $r_3$ is no greater than about 17 microns, and $r_4$ is no greater than about 25 microns, and $r_4 > r_3 > r_2 > r_1$.

8. The single mode optical waveguide of claim 7 wherein said glass core has respective Δ %, $\Delta_1$ % in the range of about 0.20% to 0.70%, $\Delta_2$ % in the range of about −0.80% to −0.15%, $\Delta_3$ % in the range of about 0.05% to 0.20%, and, $\Delta_4$ % is in the range of about −0.80% to −0.15%.

9. A single mode optical waveguide fiber comprising:

a glass core, disposed symmetrically about the waveguide fiber long axis centerline, and including at least four segments, each said segment having a refractive index profile, a refractive index $\Delta_i$ %, and an outside radius $r_i$, where i is an integer which refers to a particular segment, the segments being sequentially numbered 1 through n beginning with 1 at the centerline;

a glass clad layer formed upon and enclosing said core, said clad layer having a refractive index $n_c$;

wherein, at least two non-adjacent core segments have a refractive index $\Delta$ % which is positive, and at least two non-adjacent core segments have a refractive index $\Delta$ % which is negative;

wherein the outside radius $r_i$ and the $\Delta_i$ % of each said segment is chosen to provide the functional properties;

a dispersion slope having a magnitude of about 0.03 ps/nm$^2$-km or less over a wavelength range of about 1400 nm to 1575 nm, a zero dispersion wavelength outside the operating window which extends from about 1450 nm to 1580 nm, a mode field diameter greater than about 9 microns, and a pin array bend induced attenuation $\leq$20 dB.

10. The single mode optical wavelength of claim 9 wherein the functional properties are relatively insensitive to variation in $\Delta_i$ % of +/−3% and variation in combined radius of +/−1%.

11. The single mode fiber of claim 9 wherein the core profile is adjusted along the fiber length to allow control of total dispersion, associated with a fiber length, to a preselected value.

* * * * *

UNITED STATES PATENT AND TRADEMARK OFFICE
CERTIFICATE OF CORRECTION

PATENT NO. : 5,684,909
DATED : November 4, 1997
INVENTOR(S) : Yanming Liu

It is certified that error appears in the above-identified patent and that said Letters Patent is hereby corrected as shown below:

On the title page, insert item [73] Assignee: Corning Incorporated.

Signed and Sealed this

Twenty-eighth Day of September, 1999

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,684,909
DATED : November 4, 1997
INVENTOR(S) : Yanming Liu

It is certified that error appears in the above-identified patent and that said Letters Patent is hereby corrected as shown below:

<u>Title page,</u>
Related U.S. Application Data, insert -- Provisional Application Number 60/012,124, filed on Feb. 23, 1996. --
Immediately under the Title, please insert -- This application claims priority to and the benefit of U.S. Provisional Patent Application Number 60/012,124, filed Feb. 23, 1996.--

Signed and Sealed this

Twenty-third Day of April, 2002

Attest:

JAMES E. ROGAN
*Attesting Officer*     *Director of the United States Patent and Trademark Office*